(12) United States Patent
Suzuki et al.

(10) Patent No.: US 8,047,092 B2
(45) Date of Patent: Nov. 1, 2011

(54) SPIRAL BEVEL GEAR AND GEAR DEVICE

(75) Inventors: Yasuhiro Suzuki, Kawaguchi (JP); Issei Sato, Kawaguchi (JP)

(73) Assignee: Enplas Corporation, Saitama (JP)

( * ) Notice: Subject to any disclaimer, the term of this patent is extended or adjusted under 35 U.S.C. 154(b) by 400 days.

(21) Appl. No.: 12/383,410

(22) Filed: Mar. 24, 2009

(65) Prior Publication Data

US 2009/0241710 A1      Oct. 1, 2009

(30) Foreign Application Priority Data

Mar. 26, 2008   (JP) ................................. 2008-079925

(51) Int. Cl.
*F16H 55/17*   (2006.01)
*F16H 1/14*    (2006.01)
*F16H 1/20*    (2006.01)

(52) U.S. Cl. ........................................ 74/459.5; 74/423

(58) Field of Classification Search .................... 74/423, 74/424.5, 457, 458, 459.5, 462

See application file for complete search history.

(56) References Cited

U.S. PATENT DOCUMENTS

| 2,311,006 A | * | 2/1943 | Trbojevich ...................... 74/466 |
| 2,445,559 A | * | 7/1948 | Boor ............................. 74/459.5 |
| 2,971,788 A | * | 2/1961 | Wildhaber ................... 74/459.5 |

FOREIGN PATENT DOCUMENTS

| JP | 2002-295642 | 10/2002 |
| JP | 2007-162746 | 6/2007 |

* cited by examiner

*Primary Examiner* — Justin Krause
(74) *Attorney, Agent, or Firm* — DLA Piper LLP (US)

(57) ABSTRACT

In a spiral bevel gear, a contact area between tooth flanks that mesh with each other is increased, thereby reducing teeth knocking noise and strengthening tooth sections.

A shape of a tooth form on a normal plane T of a tooth section 15 of a spiral bevel gear becomes gradually larger as the normal plane moves from a small-diameter end section side towards a large-diameter end section side along a tooth trace H, as indicated by (a), (b), and (c). In correspondence, a tooth crest arc section S is provided in a connecting section 21 between a tooth flank 17 on a meshing side and a tooth crest 16. The tooth crest arc section S is formed such that a curvature radius r gradually increases within a range that does not exceed a radius R of an inscribed circle inscribed within two tooth flanks 17 and 18 and the tooth crest 16 on the normal plane T. The tooth crest arc section S can increase contact area when contact is made with a tooth flank of a partner gear and elastic deformation occurs.

10 Claims, 8 Drawing Sheets

SPIRAL BEVEL GEAR AND GEAR DEVICE

BACKGROUND OF THE INVENTION

1. Field of the Invention

The present invention relates to a spiral bevel gear and a gear device used in an apparatus requiring high degrees of quietness and strength.

2. Description of the Related Art

A conical, straight bevel gear is known as a gear used to transmit motion between two intersecting axes.

Among bevel gears such as this, a bevel gear is disclosed in Patent Literature 1 that is used as a differential gear in an automobile and to which a high load is applied. In the bevel gear, a curvature radius of a connecting section (fillet curve) between a tooth flank and a bottomland that is conventionally constant based on a curvature radius of a small-diameter end section side is modified to gradually increase from the small-diameter end section towards a large-diameter end section. As a result, strength is increased in the large-diameter end section that had been prone to damage, allowing sufficient strength to be evenly ensured from the small-diameter end section to the large-diameter end section.

However, in Patent Literature 1, teeth knocking noise that occurs when the gear meshes with a partner gear is loud at the connecting section. Impact force applied to a tooth section during meshing is also large.

On the other hand, a technology is disclosed in Patent Literature 2 in which, in a similar differential gear, the connecting section between a tooth crest and a tooth flank of two straight bevel gears is rounded. In Patent Literature 2, as a result of a roundness M of a gear weaker than the partner gear being greater than that of the partner gear, a position at which the teeth come into contact is displaced to be closer to a tooth root. As a result, balance can be achieved between the strength of the two meshing gears. In Patent Literature 2, because the roundness M is actively provided, a contact area with the tooth flank of the partner gear can be increased. Quietness and strength during meshing can be enhanced.

In general, a spiral bevel gear is used instead of the straight bevel gear to improve quietness and strength.

Patent Literature 1: Japanese Patent Laid-open Publication No. 2002-295642

Patent Literature 2: Japanese Patent Laid-open Publication No. 2007-162746

However, in the above-described Patent Literature 2, the roundness M is constant from the small-diameter end section to the large-diameter end section. Therefore, a maximum value of the roundness M is limited by a tooth form at the small-diameter end section. As a result, further increase in quietness and strength during meshing is difficult to achieve through further increase in the roundness M.

SUMMARY OF THE INVENTION

Therefore, an object of the present invention is to provide a spiral bevel gear and a gear device that can improve quietness and strength during meshing by a tooth crest arc section being provided in a connecting section between a tooth crest and a tooth flank on a normal plane, the tooth crest arc section having a curvature radius that is greater on a large-diameter end section side than a small-diameter end section side (the curvature radius can be partially the same).

A first aspect of the invention relates to a spiral bevel gear having a plurality of tooth sections on an outer peripheral surface of a root cone along a circumferential direction. A tooth section has a curved tooth trace. In the tooth section, a shape of a tooth form on a normal plane perpendicular to the tooth trace of the tooth section becomes gradually larger as the normal plane moves from a small-diameter end section side towards a large-diameter end section side along the tooth trace.

In the spiral bevel gear of the invention, the tooth section has a tooth crest arc section formed into an arc shape in a connecting section between a tooth flank on a meshing side and a tooth crest on the normal plane. The tooth crest arc section is formed such that a curvature radius gradually increases as the normal plane moves from the small-diameter end section side towards the large-diameter end section side within a meshing region along the tooth trace. The curvature radius gradually increases within a range that does not exceed a radius of an inscribed circle inscribed within two tooth flanks and the tooth crest on the normal plane.

A second aspect of the invention relates to a spiral bevel gear having a plurality of tooth sections on an outer peripheral surface of a root cone along a circumferential direction. A tooth section has a curved tooth trace. In the tooth section, a shape of a tooth form on a normal plane perpendicular to the tooth trace of the tooth section becomes gradually larger as the normal plane moves from a small-diameter end section side towards a large-diameter end section side along the tooth trace In the spiral bevel gear of the invention, the tooth section has a tooth crest arc section formed into an arc shape in two connecting sections between two tooth flanks and a tooth crest on the normal plane. The tooth crest arc section is formed such that a curvature radius gradually increases as the normal plane moves from the small-diameter end section side towards the large-diameter end section side within a meshing region along the tooth trace. The curvature radius gradually increases within a range that does not exceed a radius of an inscribed circle inscribed within the two tooth flanks and the tooth crest on the normal plane.

A third aspect of the invention is the spiral bevel gear according to the first or second aspect in which the curvature radius of the tooth crest arc section is equal to the radius of the inscribed circle.

A fourth aspect of the invention is the spiral bevel gear according to any one of the first to third aspects in which a relief is formed on both end sections in a tooth width direction of at least one tooth flank, between the two tooth flanks of the tooth section.

A fifth aspect of the invention relates to a gear device including a first spiral bevel gear and a second spiral bevel gear that meshes with the first spiral bevel gear. The first spiral bevel gear and the second spiral bevel gear have a plurality of tooth sections on an outer peripheral surface of a root cone along a circumferential direction. A tooth section has a curved tooth trace. In the tooth section, a shape of a tooth form on a normal plane perpendicular to the tooth trace of the tooth section becomes gradually larger as the normal plane moves from a small-diameter end section side towards a large-diameter end section side along the tooth trace.

In the gear device of the invention, the tooth section of the first spiral bevel gear has a tooth crest arc section formed into an arc shape in a connecting section between a tooth flank on a meshing side and a tooth crest on the normal plane. The tooth crest arc section is formed such that a curvature radius gradually increases as the normal plane moves from the small-diameter end section side towards the large-diameter end section side within a meshing region along the tooth trace. The curvature radius gradually increases within a range that does not exceed a radius of an inscribed circle inscribed within two tooth flanks and the tooth crest on the normal plane. The tooth section of the second spiral bevel gear has a tooth root arc section formed into an arc shape in a connecting section between a tooth flank on a meshing side and a bottomland on the normal plane. The tooth root arc section is formed such that a curvature radius gradually increases as the normal plane moves from the small-diameter end section side towards the large-diameter end section side within a meshing region along the tooth trace. The curvature radius gradually increases within a range that is smaller than the curvature radius of the tooth crest arc section of the first spiral bevel gear on the normal plane.

A sixth aspect of the invention relates to a gear device including a first spiral bevel gear and a second spiral bevel gear that meshes with the first spiral bevel gear. The first spiral bevel gear and the second spiral bevel gear have a plurality of tooth sections on an outer peripheral surface of a root cone along a circumferential direction. A tooth section has a curved tooth trace. In the tooth section, a shape of a tooth form on a normal plane perpendicular to the tooth trace of the tooth section becomes gradually larger as the normal plane moves from a small-diameter end section side towards a large-diameter end section side along the tooth trace.

In the gear device of the invention, the tooth section of the first spiral bevel gear has a tooth crest arc section formed into an arc shape in two connecting sections between two tooth flanks and a tooth crest on the normal plane. The tooth crest arc section is formed such that a curvature radius gradually increases as the normal plane moves from the small-diameter end section side towards the large-diameter end section side within a meshing region along the tooth trace. The curvature radius gradually increases within a range that does not exceed a radius of an inscribed circle inscribed within the two tooth flanks and the tooth crest on the normal plane. The tooth section of the second spiral bevel gear has a tooth root arc section formed into an arc shape in two connecting section between two tooth flanks and two bottomlands on the normal plane. The tooth root arc section is formed such that a curvature radius gradually increases as the normal plane moves from the small-diameter end section side towards the large-diameter end section side within a meshing region along the tooth trace. The curvature radius gradually increases within a range that is smaller than the curvature radius of the tooth crest arc section of the first spiral bevel gear on the normal plane.

A seventh aspect of the invention is the gear device according to the sixth aspect in which a tooth crest arc section similar to the two tooth crest arc sections of the tooth section of the first spiral bevel gear is formed in connecting sections between the two tooth flanks and the tooth crest of the tooth section of the second spiral bevel gear.

An eighth aspect of the invention is the gear device according to the seventh aspect in which a tooth root arc section similar to the two tooth root arc sections of the tooth section of the second spiral bevel gear is formed in connecting sections between the two tooth flanks and the two bottomlands of the tooth section of the first spiral bevel gear.

A ninth aspect of the invention is the gear device according to any one of the fifth to eighth aspects in which a relief is formed on both end sections in a tooth width direction of at least one of two tooth flanks that are in contact with each other, among two tooth flanks of the tooth section of the first spiral bevel gear and two tooth flanks of the tooth section of the second spiral bevel gear.

In the present invention, the curvature radius of the tooth crest arc section gradually increases within a range that does not exceed the inscribed circle and becomes closer to the radius of the inscribed circle, as the normal plane moves from the small-diameter end section side towards the large-diameter end section side within the meshing area along the tooth trace. Therefore, contact area can be increased when the tooth crest arc section comes into contact with a tooth flank of a partner gear and elastically deforms. As a result, teeth knocking noise can be reduced, and force applied per unit area can be reduced.

When the tooth crest arc section is provided in the tooth section of the first spiral bevel gear, the tooth root arc section is formed on a tooth root of the second gear that meshes with the first spiral bevel gear, the tooth root corresponding with the tooth crest arc section of the first spiral bevel gear. The curvature radius of the tooth root arc section gradually increases within a range that is smaller than the curvature radius of the tooth crest arc section, as the normal plane moves from the small-diameter end section side towards the large-diameter end section side within the meshing region along the tooth trace. As a result of the curvature radius of the tooth root arc section being increased under this condition, strength of the tooth section including the tooth root arc section can be increased.

BRIEF DESCRIPTION OF THE DRAWINGS

FIG. 3A, FIG. 3B, and FIG. 3C are diagrams of across-section T in the spiral bevel gear 10 of the present invention, the cross-section T being an intersection between a virtual plane H that is perpendicular to an axial center CL and a tooth section 15.

DETAILED DESCRIPTION OF THE PREFERRED EMBODIMENT

Embodiments of a spiral bevel gear and a gear device of the present invention will hereinafter be described in detail with reference to the drawings.

First Embodiment

Figure 1:
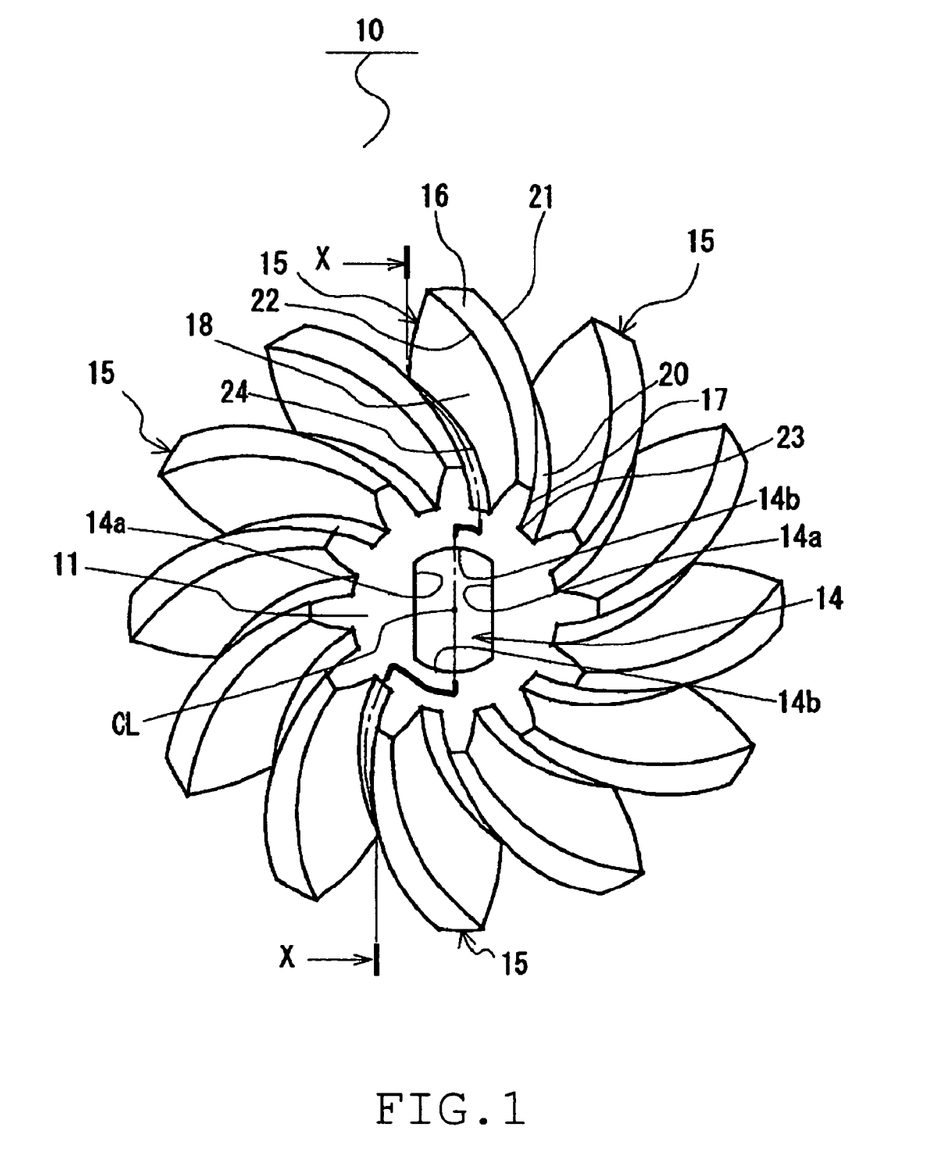
FIG. 1 is a front view of a spiral bevel gear 10 (viewed from a direction of arrow F in FIG. 2)
Figure 2:
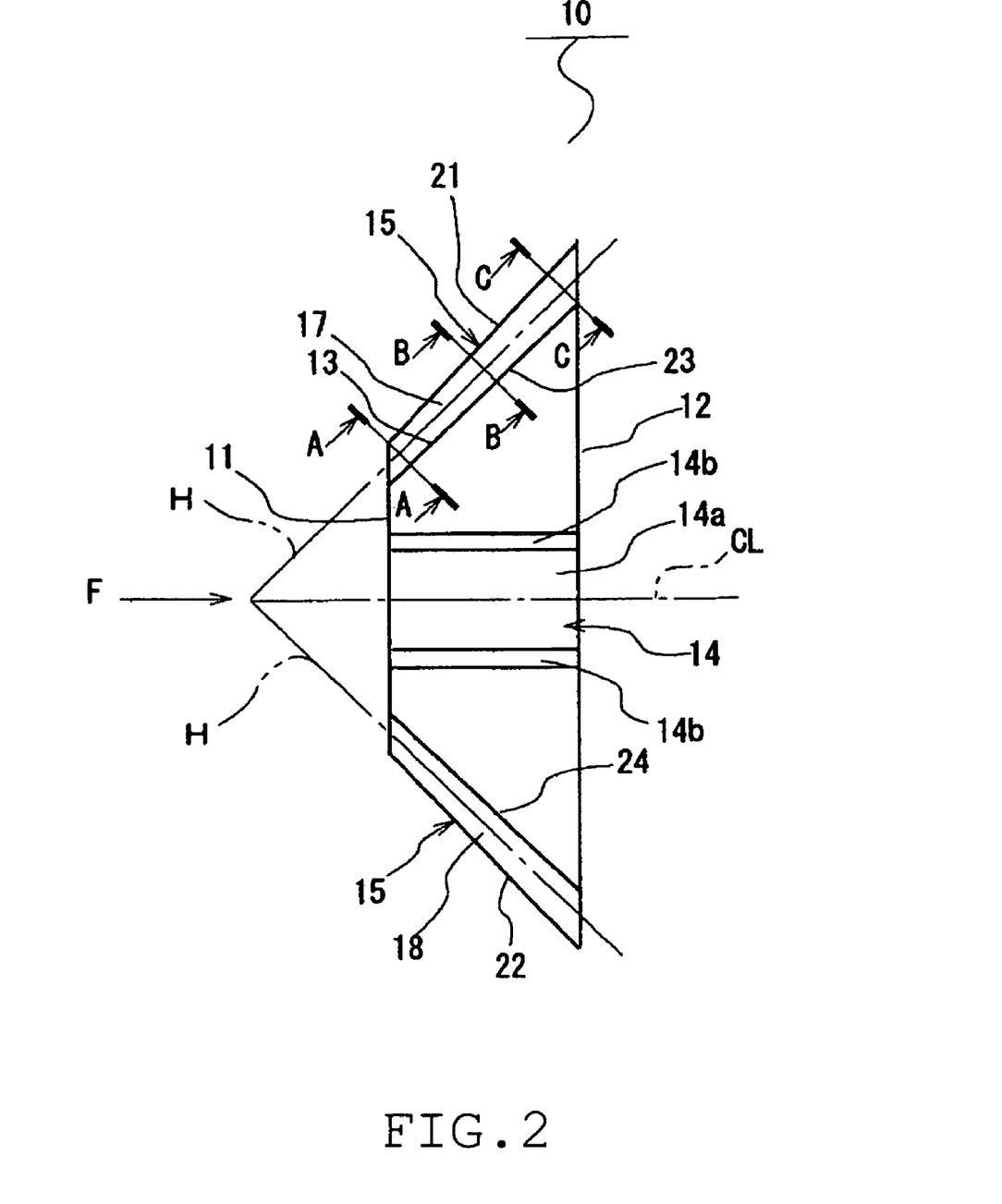
FIG. 2 is a cross-sectional view taken along line A-A in FIG. 1.
Figure 3A:
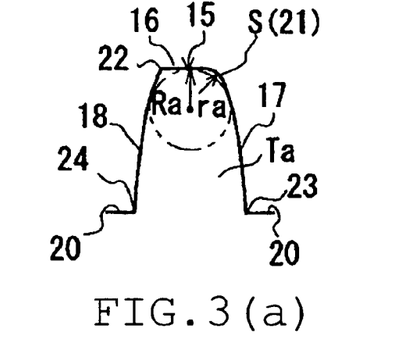
FIG. 3A is across-section Ta of when the virtual plane H matches a small-diameter end section 11 (positioned at a on the axial center CL), viewed from a direction of arrow A-A.
Figure 3B:
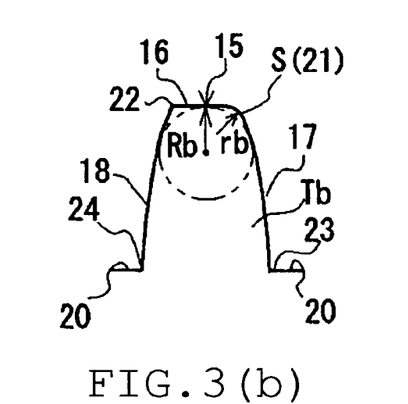
FIG. 3B is a cross-section Tb of when the virtual plane H is positioned at b on the axial center CL, viewed from a direction of arrow B-B.
Figure 3C:
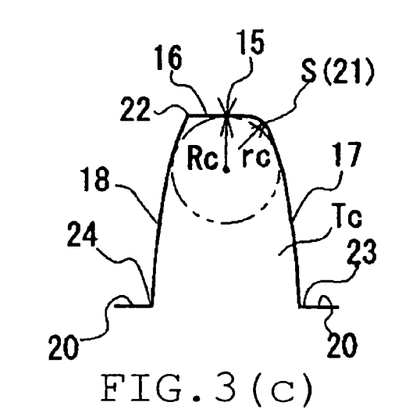
FIG. 3C is a cross-section Tc of when the virtual plane H matches a large diameter end section 12 (positioned at c on the axial center CL), viewed from a direction of arrow C-C.

A spiral bevel gear 10 according to a first embodiment will be described with reference to FIG. 1 to FIG. 3. FIG. 1 is a front view of the spiral bevel gear 10 (viewed from a direction of arrow F in FIG. 2). FIG. 2 is a cross-sectional view taken along line X-X in FIG. 1. FIG. 3 are diagrams of a normal plane T perpendicular to a tooth trace H in a tooth section 15 of the spiral bevel gear 10 according to the first embodiment. FIG. 3A is an enlarged view of a normal plane Ta positioned closest to a small-diameter end section 11 side, viewed from a direction of arrow A-A. FIG. 3B is an enlarged view of a normal plane Tb positioned between the small-diameter end section 11 side and a large-diameter end section 12 side, viewed from a direction of arrow B-B. FIG. 3C is an enlarged view of a normal plane Tc positioned closest to the large-diameter end section 12 side, viewed from a direction of arrow C-C.

As shown in FIG. 1 and FIG. 2, the spiral bevel gear 10 is formed having a roughly conical shape, based on an axial center CL that serves as a rotational center. The spiral bevel gear 10 has a small-diameter end section 11 and a large-diameter end section 12 at two different positions along the axial center CL, as shown in FIG. 2. An outer peripheral surface 13 of a root cone is provided between the small-diameter end section 11 and the large-diameter end section 12.

As shown in FIG. 2, an axial hole 14 is formed in the center of the spiral bevel gear 10, such as to penetrate the spiral bevel gear 10 from the small-diameter end section 11 side to the large-diameter end section 12 side along the axial center CL. The axial hole 14 does not have a cylindrical shape. Instead, the axial hole 14 is formed by a pair of flat surfaces 14*a* and 14*a* that are parallel with each other and a pair of arc-shaped curved surfaces 14*b* and 14*b* that opposing each other. The pair of flat surfaces 14*a* and 14*a* form a width across flat. The pair of curved surfaces 14*b* and 14*b* are disposed such as to connect with respective end sections of the pair of flat surfaces 14*a* and 14*a* in the same direction. An axis having a similar shape (not shown) is fitted into the axial hole 14 along the axial center CL. The above-described pair of flat surfaces 14*a* and 14*a* serve as rotation stoppers. In other words, relative rotation of the spiral bevel gear 10 and the axis is prohibited. The spiral bevel gear 10 and the axis rotate as one. When the spiral bevel gear 10 is a driving gear, rotation of the axis serving as a driving axis is transmitted to the spiral bevel gear 10. The rotation is then transmitted to a partner gear serving as a driven gear (not shown) that meshes with the spiral bevel gear 10. On the other hand, when the spiral bevel gear 10 is the driven gear, rotation of the partner gear serving as the driving gear is transmitted to the spiral bevel gear 10 and is further transmitted to the axis.

A plurality of tooth sections 15 are formed on the outer peripheral surface 13 of the root cone of the spiral bevel gear 10 shown in FIG. 1. The tooth sections 15 are formed along the circumferential direction at a predetermined pitch. In the tooth section 15, the tooth trace H is formed having a leftward twist. In other words, the tooth trace H is formed such as to twist in a counter-clockwise direction in FIG. 1, from the small-diameter end section 11 towards the large-diameter end section 12. In the partner gear that meshes with the spiral bevel gear 10, the tooth trace H of the tooth section is formed having a rightward twist that is opposite of that of the spiral bevel gear 10. The tooth section 15 has a tooth crest 15, and two tooth flanks 17 (convex tooth flank) and 18 (concave tooth flank). Bottomlands 20 and 20 are continuously formed at the tooth root. In general, arc-shaped curved sections caused by a cutting tool (such as a gear hobber [not shown]) when each generating tooth form is formed are formed in connecting sections 21 and 22 between the tooth crest 16 and the two tooth flanks 17 and 18, and connecting sections 23 and 24 between the two tooth flanks 17 and 18 and the two bottomlands 20 and 20. The arc-shaped curved sections are formed having a fixed size (referred to, hereinafter, accordingly as "standard arc section") based on the size of the spiral bevel gear 10, the module, and the like. In other words, the standard arc sections formed in the connecting sections 21 and 22 are ordinarily fixed regardless of the position along the tooth trace H of the normal plane perpendicular to the tooth trace H. In the description hereafter, the standard arc section is formed in sections in which a tooth crest arc section S and a tooth root arc section M, described hereafter, are not formed. In the spiral bevel gear 10, the standard arc section has the smallest curvature radius.

In the spiral bevel gear 10 shown in FIG. 1 and FIG. 2, the normal plane T of the tooth section 15 gradually increases as the normal plane T moves from the small-diameter end section 11 to the large-diameter end section 12 along the tooth trace H. In other words, when, as shown in FIG. 3A, the normal plane formed closest to the small-diameter end section 11 side along the tooth trace H is Ta, when, as shown in FIG. 3C, the normal plane formed closest to the large-diameter end section 12 side is Tc, and when, as shown in FIG. 3B, the normal plane formed between the small-diameter end section 11 and the large-diameter end section 12 is Tb, the shape of the tooth forms of the normal planes Ta, Tb, and Tc gradually increases in order of Ta, Tb, and Tc. In other words, Ta<Tb<Tc. In other words, the tooth sections 15 are formed such that the tooth thickness and the tooth height on the normal plane T gradually increase as the normal plane T moves from the small-diameter end section 11 side to the large-diameter end section 12 side along the tooth trace H.

Here, with a radius of an inscribed circle inscribed within the tooth crest 16 and the two tooth flanks 17 and 18 on an arbitrary normal plane T of the tooth section 15 as R, a curvature radius of the inscribed circle on the normal plane Ta as Ra, a curvature radius of the inscribed circle on the normal plane Tb as Rb, and a curvature radius of the inscribed circle on the normal plane Tc as Rc, a relationship Ra<Rb<Rc is established among the curvature radii Ra, Rb, and Rc. In other words, the radius R of the inscribed circle gradually increases as the normal plate T moves from the small-diameter end section 11 side towards the large-diameter end section 12 side along the tooth trace H.

According to the first embodiment, when, between the connecting sections 21 and 22 between the tooth crest 16 and the two tooth flanks 17 and 18, the connecting section 21 on the side (meshing side) in contact with the tooth flank of the tooth section of the partner gear (not shown) is the tooth crest arc section S that is formed into an arc shape, the tooth crest arc section S is formed such that the curvature radius r of the tooth crest arc section S meets the conditions below, in correspondence with the gradual increase in the radius R.

In other words, regarding the curvature radius r of the tooth crest arc section S on an arbitrary normal plane T, the curvature radius r gradually increases as the normal plane T moves from the small-diameter end section 11 side to the large-diameter end section 12 side along the tooth trace H, within a range that does not exceed the radius R of the inscribed circle inscribed within the two tooth flanks 17 and 18 and the tooth crest 16 on the normal plane T. In other words, the tooth section 15 is formed such that the curvature radius r of the tooth crest arc section S gradually increases as the tooth crest arc section S moves from the small-diameter end section 11 side towards the large-diameter end section 12 side along the tooth trace H.

In the examples shown in FIG. 3, in correspondence with FIG. 3A, FIG. 3B, and FIG. 3C and the increase in the radius R of the inscribed circle in order of Ra, Rb, and Rc, the curvature radius r of the tooth crest arc section S also increases in order of ra, rb, and rc.

As a result of the curvature radius r of the tooth crest arc section S being set to a large radius within a range meeting the above-described condition, in the spiral bevel gear 10, when the tooth crest arc section S comes into contact with the tooth flank of the partner gear and elastically deforms, the contact area of the contacting section can be increased, thereby reducing the teeth knocking noise. The force applied to the tooth flank 17 of the tooth section 15 of the spiral bevel gear 10 per unit area can be reduced. As a result, the strength of the tooth section 15 can be increased.

Here, when the curvature radius r of the tooth crest arc section S is a maximum radius, the contact area during contact can be maximized. On the normal plane T, to maximize the curvature radius r of the tooth crest arc section S, the curvature radius r is set to be the same as the radius R of the inscribed circle on the same normal plane T. When the curvature radius r of the tooth crest arc section S exceeds the radius R of the inscribed circle, the tooth height of the tooth section 15 becomes short, thereby hindering meshing with the partner gear. Therefore, the curvature radius r of the tooth crest arc section S is at maximum the same (r=R) as the radius R of the inscribed circle. When r<R, a portion of the tooth crest 16 remains in a shape of a band curved along the tooth trace H.

In the description above, between the two connecting sections 21 and 22 of the tooth section 15 of the spiral bevel gear 10, the tooth crest arc section S is provided only in the connecting section 21 on the side that is in contact with the partner gear. Here, when the spiral bevel gear 10 is the driving gear, the side that is in contact with the partner gear refers to a side positioned on a downstream side along a rotation direction between the two tooth flanks 17 and 18 of the tooth section 15. On the other hand, when the spiral bevel gear 10 is the driven gear, the side that is in contact with the partner gear refers to a side positioned on a upstream side along the rotation direction between the two tooth flanks 17 and 18 of the tooth section 15.

According to the above-described first embodiment, an example is described in which the tooth crest arc section S is formed on the connecting section 21, between the connecting sections 21 and 22 of the tooth section 15 of the spiral bevel gear 10, under an assumption that the connecting section 21 comes into contact with the partner gear. However, when the connecting section 22 comes into contact with the tooth flank of the tooth section of the partner gear, the tooth crest arc section S is provided in the connecting section 22 instead of the connecting section 21.

Moreover, the tooth crest arc section S can be provided on both of the two connecting sections 21 and 22 of the tooth crest 16 of the tooth section 15 of the spiral bevel gear 10. As a result, the contact area with the tooth flank of the contacting partner gear can be increased regardless of whether the spiral bevel gear 10 is a driving gear or a driven gear and regardless of the rotation direction. In this case as well, when the curvature radius r of the tooth crest arc section S is the same as the radius R of the inscribed circle, the contact area can be maximized. When the spiral bevel gear 10 twists to the left, as shown in FIG. 1, is described above. However, the present invention is not limited thereto. The same can be applied when the spiral bevel gear 10 twists to the right.

Second Embodiment

Figure 4:
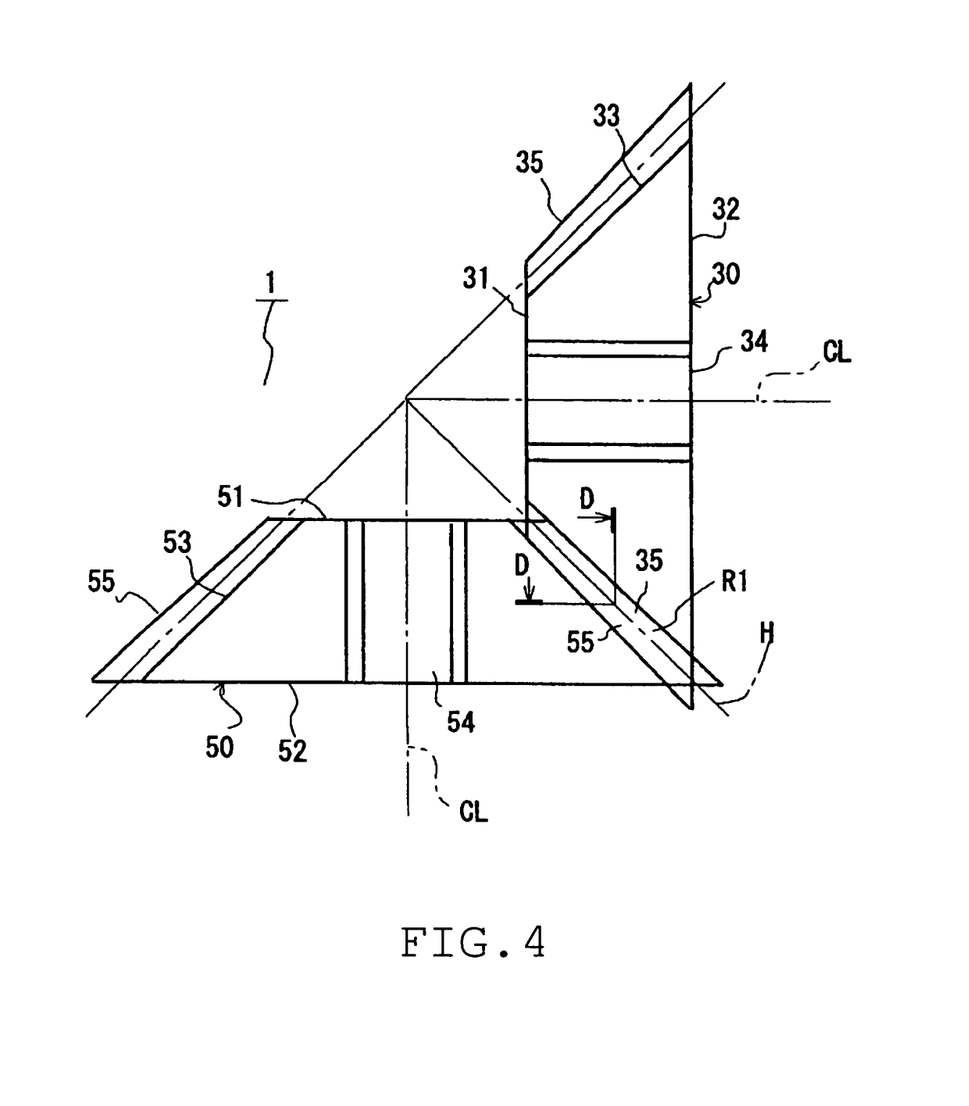
FIG. 4 is a diagram equivalent to FIG. 2, and shows a meshed state between a spiral bevel gear 30 and a spiral bevel gear 50 having the same tooth width.
Figure 5:
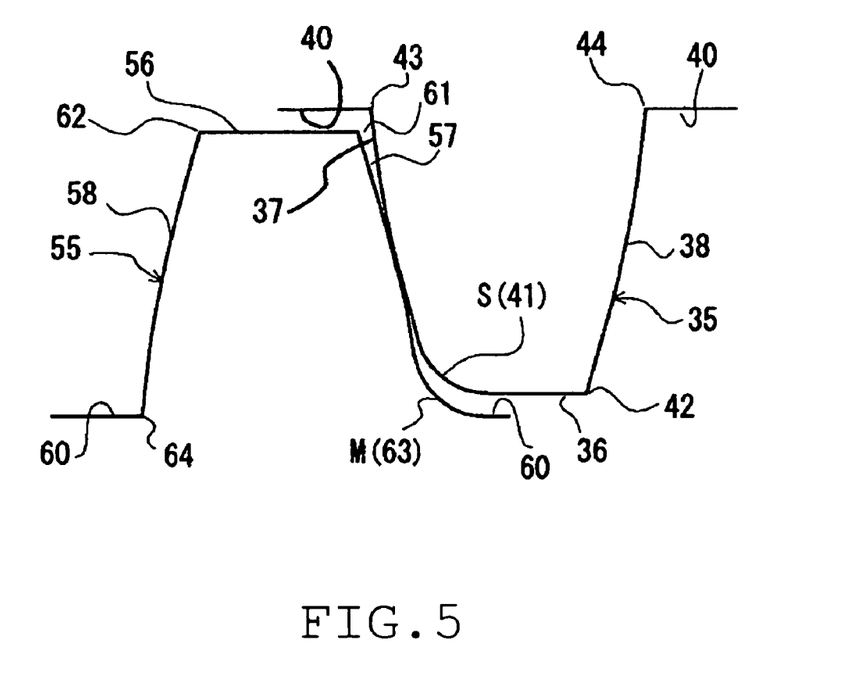
FIG. 5 is a cross-sectional view taken along line D-D in FIG. 4.

A gear device 1 of the present invention will be described with reference to FIG. 4 and FIG. 5. FIG. 4 is a diagram equivalent to FIG. 2 according to the above-described first embodiment. FIG. 5 is an enlarged view of a normal plane T perpendicular to a tooth trace H at a meshing section between tooth sections 35 and 55 of spiral bevel gears 30 and 50 of the gear device 1, viewed from a direction of arrow D-D.

As shown in FIG. 4, the gear device 1 includes two spiral bevel gears 30 and 50 that mesh with each other. In other words, the gear device 1 includes a spiral bevel gear 30 in which the tooth trace H has a leftward twist and a spiral bevel gear 50 in which the tooth trace H has a rightward twist. The spiral bevel gear 30 and the spiral bevel gear 50 have the same tooth width. A meshing region R1 is formed along the overall width.

The spiral bevel gear 30 is formed in a manner similar to the spiral bevel gear 10 according to the above-described first embodiment. In other words, the overall spiral bevel gear 30 is formed having a roughly conical shape. The spiral bevel gear 30 has a small-diameter end section 31 and a large-diameter end section 32 at different positions along an axial center CL. An axial hole 34 is formed along the axial center CL. A plurality of tooth sections 35 are formed on an outer peripheral surface 33 along a circumferential direction. As shown in FIG. 5, the tooth section 35 includes a tooth crest 36, and two tooth flanks 37 and 38. The tooth crest 36, and the two tooth flanks 37 and 38 are connected, thereby forming connecting sections 41 and 42. Moreover, the two tooth flank 37 and 38, and bottomlands 40 are connected, thereby forming connecting sections 43 and 44. A normal plane that is perpendicular to the tooth trace H gradually increases from the small-diameter end section 31 towards the large-diameter end section 32, along the tooth trace H.

The spiral bevel gear 50 that meshes with the spiral bevel gear 30 is formed in a similar manner, aside from the direction of the twist being opposite of that of the spiral bevel gear 30. In other words, the spiral bevel gear 50 includes a small-diameter end section 51, a large-diameter end section 52, an outer peripheral surface 53, an axial hole 54, and a plurality of tooth sections 55. The tooth section 55 includes a tooth crest 56, two tooth flanks 57 and 58, and a bottomland 60. Connecting sections 61 and 62 are formed between the tooth crest 56 and the two tooth flanks 57 and 58. Connecting sections 63 and 64 are formed between the two tooth flanks 57 and 58 and bottomlands 60 and 60. The normal plane T that is perpendicular to the tooth trace H gradually increases from the small-diameter end section 51 towards the large-diameter end section 52, along the tooth trace H.

According to the second embodiment, in the above-described spiral bevel gear 30, a tooth crest arc section S that is similar to the tooth crest arc section S of the above-described spiral bevel gear 10 is formed on one connecting section 41, between the two connecting sections 41 and 42 on the tooth crest 36 side of the tooth section 35. The other connecting section 42 remains as the standard arc section.

In this way, because the tooth crest arc section S is provided in the one connecting section 41 of the tooth section 35 of the spiral bevel gear 30, interference from the corresponding connecting section 63 on the tooth root side of the tooth section 55 of the spiral bevel gear 50 does not easily occur. Therefore, a tooth root arc section M having a curvature radius r that is greater than that of the standard arc section can be formed in the connecting section 63.

The tooth root arc section M of the tooth section 55 of the second spiral bevel gear 50 is restricted by the size of the tooth crest arc section S of the tooth section 35 of the first spiral bevel gear 30, described above.

In other words, the tooth root arc section M is formed such that the curvature radius r on the normal plane T gradually increases within a range that is smaller than the curvature radius r of the tooth crest arc section of the first spiral bevel gear 30, as the normal plane T moves from the small diameter end section 51 side towards the large-diameter end section 52 side, along the tooth trace H, within the meshing region R1.

As a result of the curvature radius r of the tooth root arc section M being increased within a range meeting the above-described condition, the tooth root can be strengthened and made capable of withstanding high loads. The curvature radius r of the tooth root arc section M can be maximized when the curvature radius r of the tooth crest arc section S of the first spiral bevel gear 30 is set to be the same as the radius R of the inscribed circle on the plane. At this time, the tooth section 55 of the second spiral bevel gear 50 can be at its strongest.

In the above-described example according to the second embodiment, in correspondence with the tooth crest arc section S being provided in one connecting section 41 on the tooth crest 36 side of the tooth section 35 of the first spiral bevel gear 30, the tooth root arc section M is formed on one connecting section 63 on the tooth root side of the tooth section 55 of the second spiral bevel gear 50. However, when the tooth crest arc section S is provided on both of the two connecting sections 41 and 42 on the tooth crest 36 side of the tooth section 35 of the first spiral bevel gear 30, the tooth root arc section M can be formed in both of the two connecting sections 63 and 64 on the tooth root side of the tooth section 55 of the second spiral bevel gear 50. As a result, the strength of the tooth section 55 of the second spiral bevel gear 50 can be further enhanced.

Moreover, the tooth crest arc sections S can be formed in the connecting sections 61 and 62 on the tooth crest 56 side of the tooth section 55 of the second spiral bevel gear 50, similar to the tooth crest arc sections S formed on the tooth crest 36 side of the tooth section 35 of the first spiral bevel gear 30. In correspondence, the tooth root arc sections M can be formed in the connecting sections 43 and 44 on the tooth root side of the tooth section 35 of the first spiral bevel gear 30, similar to the tooth root arc sections M on the tooth root side of the tooth section 55 of the second spiral bevel gear 50. In other words, in the tooth section 35 of the first spiral bevel gear 30, the tooth crest arc section S is formed in both of the two connecting sections 41 and 42 on the tooth crest 36 side, and the tooth root arc section M is formed in both of the two connecting sections 43 and 44 on the tooth root side. In a similar manner, in the tooth section 55 of the second spiral bevel gear 50, the tooth crest arc section S is formed in both of the two connecting sections 61 and 62 on the tooth crest 56 side, and the tooth root arc section M is formed in both of the two connecting sections 63 and 63 on the tooth root side. As a result of the gear device 1 being configured by the first spiral bevel gear 30 and the second spiral bevel gear 50 such as those described above, noise attributed to teeth knocking noise during rotation can be reduced regardless of which gear is driving and being driven, and regardless of the rotation direction. Furthermore, strength of each tooth section 35 and 55 can be enhanced.

Figure 6:
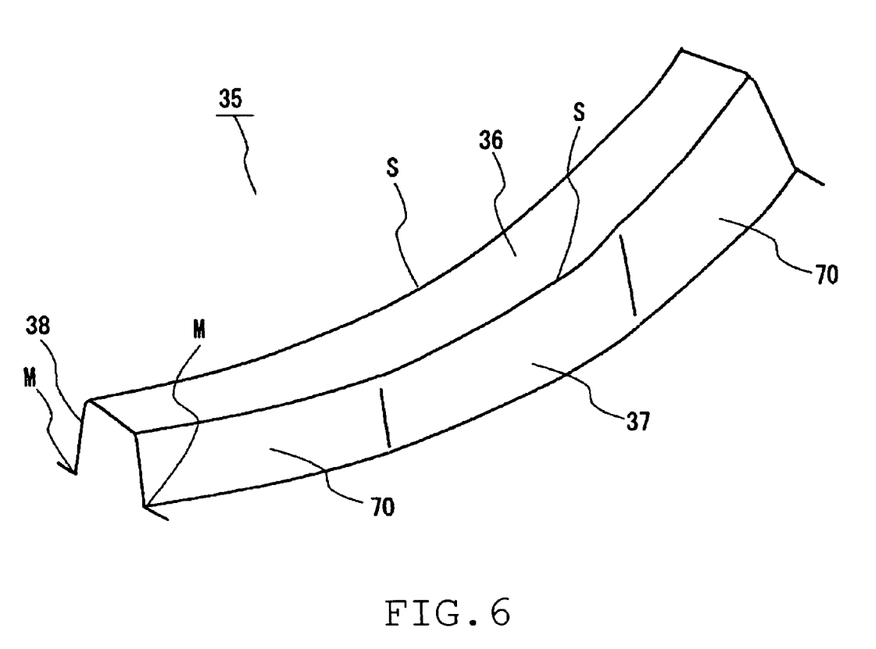
FIG. 6 is a perspective view explaining a relief formed on a tooth flank.

Moreover, as shown in FIG. 6, a relief 70 is provided on at least one of the two tooth flanks 37 and 38 of the tooth section 35 of the first spiral bevel gear 30, such as the tooth flank 37 that is in contact with the tooth flank 57 of the tooth section 55 of the second spiral bevel gear 50. The relief 70 is formed such that the tooth flank 37 is cut by small amount in the thickness direction over most the tooth flank 37 in the tooth height direction, from one end face of the tooth section 35 towards the center in the tooth width direction, such as over about one-third of the tooth width. In other words, when the tooth flank 37 on which the relief 70 is formed is compared with the tooth flank 37 on which the relief 70 is not formed, the thickness of the tooth flank 37 on which the relief 70 is formed gradually changes from the end face towards the center in the tooth width direction. As a result, for example, when the first spiral bevel gear 30 and the second spiral bevel gear 50 are assembled, even when misalignment occurs in the attachment accuracy of each axial center CL of the first spiral bevel gear 30 and the second spiral bevel gear 50, the tooth flank 37 of the tooth section 35 of the first spiral bevel gear 30 and the tooth flank 57 of the tooth section 55 of the second spiral bevel gear 30 are prevented from coming into contact at an end section in the tooth width direction. Partial contact can be prevented. Instead of the relief 70 being provided on the tooth flank 37 of the tooth section 35 of the first spiral gear 30, the relief 70 can be provided on the tooth flank 57 side of the tooth section 50 of the second spiral bevel gear 50.

When the tooth flank 37 of the first spiral bevel gear 30 and the tooth flank 57 of the second spiral bevel gear 50 are in contact with each other, and the tooth flanks 38 and 58 also come into contact with each other, the relief is preferably provided on one of the tooth flank 38 and the tooth flank 58 as well. In this case, when the relief is already formed on the tooth flank 37, the relief is formed on the tooth flank 58 rather than the tooth flank 38. On the other hand, when the relief is already formed on the tooth flank 38, the relief is formed on the tooth flank 57 rather than the tooth flank 37. In this way, because the relief is formed on only one tooth flank of each tooth section 35 and the tooth section 55, the tooth thickness of the tooth sections 35 and 55 is prevented from becoming thin. However, the relief can be formed on the two tooth flanks 37 and 38 of the tooth section 35, and the two tooth flanks 57 and 58 of the tooth section 55.

Here, a product of the present invention in which the tooth crest arc sections S, the tooth root arc sections M, and the reliefs are formed in the tooth section 35 of the first spiral bevel gear 30 and the tooth section 55 of the second spiral bevel gear 50, described above, will be compared with an original product in which none of the tooth crest arc sections S, the tooth root arc sections M, and the reliefs are formed. The comparison is made regarding noise and strength (tooth root stress and generated contact pressure). The tooth crest arc section S and the tooth root arc section M are formed such that the curvature radii r is at a maximum. In other words, the curvature radii r is the same as the radius R of the above-described inscribed circle. The relief is formed on only one of the tooth flanks that are in contact with each other. The axial centers CL of the first spiral bevel gear 30 and the second spiral bevel gear 50 are disposed in roughly the standard position based on design (error of about ±0.05).

The original product and the product of the present invention are compared through testing, with N as a certain constant for noise, Fa as a certain constant for tooth root stress, and Fb as a certain constant for generated contact pressure). As a result, in terms of noise, the product of the present invention dropped to 11N compared to 14N in the original product. In terms of tooth root stress, the product of the present invention is 14Fa, whereas the original product is 24Fa. In terms of generated contact pressure, the product of the present invention is 145Fb, whereas the original product is 325Fb. In this way, it is clear that both the tooth root stress and the generated contact pressure are reduced in the product of the present invention. As a result, it is clear that greater power can be transmitted.

The spiral bevel gear 10, the first spiral bevel gear 30, and the second spiral bevel gear 50 according to the above-described first and second embodiments can be formed by injection-molding of a synthetic resin material, such as a thermoplastic material including polyacetal, polyamide, polyphenylene sulfide, and polybutylene terephthalate.

As shown in FIG. 6, because the relief 70 is provided, even when an assembly error occurs in the axial center and the like when the spiral bevel gears are assembled, partial contact of the tooth flank 37 can be prevented, and contact with the tooth flank of the partner gear can be made on the center side in the tooth width direction.

In the gear device 1 according to the above-described second embodiment, when the tooth width of the spiral bevel gear 30 and the tooth width of the spiral bevel gear 50 are the same is described. When a tooth width W1 of the spiral bevel gear 50 and a tooth width W2 of a spiral bevel gear 80 differ will be described with reference to FIG. 7. In other words, when the tooth width W2 of the spiral bevel gear 80 is wider than the tooth width W1 of the spiral bevel gear 50 will be described. The spiral bevel gear 50 is the same as the spiral bevel gear 50 shown in FIG. 40. Explanation thereof is omitted. The spiral bevel gear 80 is configured in a manner similar to the spiral bevel gear 30 shown in FIG. 4, aside from the tooth width W2 being wider than the tooth width of the spiral bevel gear 30. In other words, the spiral bevel gear 80 includes a small-diameter end section 81, a large-diameter end section 82, an outer peripheral surface 83, an axial hole 84, and a plurality of tooth sections 85. Normal planes Ta, Tb, and Tc (see FIG. 3A, FIG. 3B, and FIG. 3C) that are perpendicular to the tooth trace H gradually increase from the small-diameter end section 81 towards the large-diameter end section 82, along the tooth trace H.

The above-described spiral bevel gear 80 is formed such that the tooth width W2 is wider than the tooth width W1 of the spiral bevel gear 50. Therefore, when the tooth section 55 of the spiral bevel gear 50 and the tooth section 85 of the spiral bevel gear 80 mesh, the meshing region R1 is formed on the tooth section 55 of the spiral bevel gear 50 over the overall width in the troth width direction. On the other hand, in the tooth section 85 of the spiral bevel gear 80, a portion on the small-diameter end section 81 side and a portion on the large-diameter end section 82 side extend beyond the meshing region R1, forming run-over sections R2 and R3. Regarding the run-over sections R2 and R3, the curvature radius r of the tooth crest arc section (see FIG. 3) can be arbitrarily set. In other words, within the meshing region R1 of the tooth section 55 of the spiral bevel gear 50 and the tooth section 85 of the spiral bevel gear 80, the tooth crest arc section S on the meshing surface side of at least one tooth section is formed such that the curvature radius r gradually increases from the small-diameter end sections 51 and 81 side towards the large-diameter end sections 52 and 82 side, within a range that does not exceed the radii Ra, Rb, and Rc (see FIG. 3) of the inscribed circle inscribed within the two tooth flanks and the tooth crest on the normal plane. On the other hand, regarding the run-over sections R2 and R3 that are present beyond the meshing region R1, the curvature radius r of the tooth crest arc section can be arbitrarily set. For example, the curvature radius r can be gradually increased in a manner similar to that within the meshing region R1. Alternatively, the curvature radius can be constant. In the example shown in FIG. 7, when the run-over sections R2 and R3 are formed on both sides of the meshing region R1 along the tooth trace H is described. However, the curvature radius r of the tooth crest arc section S in the run-over section can be arbitrarily set even when the run-over section is formed on one side of the meshing region R1.

Figure 7:
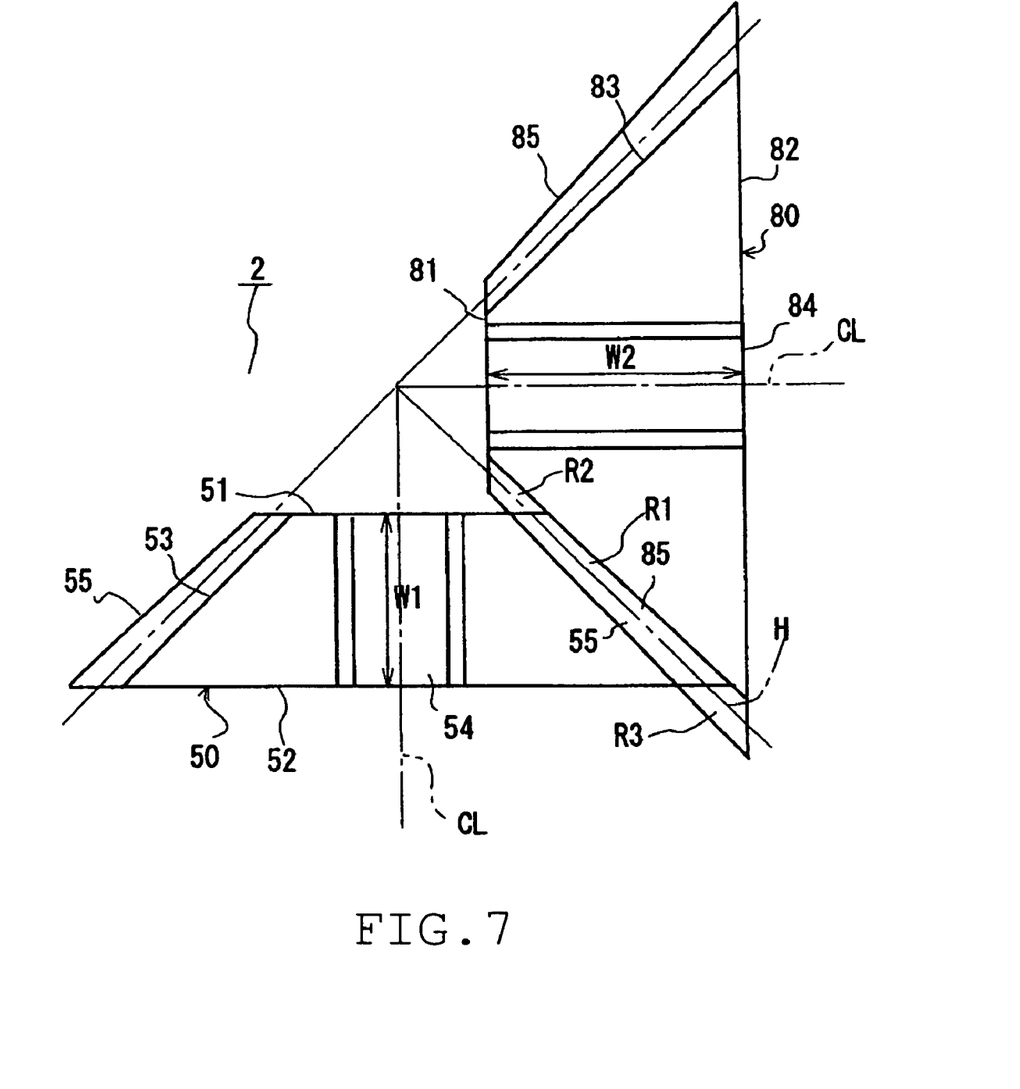
FIG. 7 is a diagram equivalent to FIG. 2, and shows a meshed state between the spiral bevel gear 50 and a spiral bevel gear 80 having different tooth width.
Figure 8:
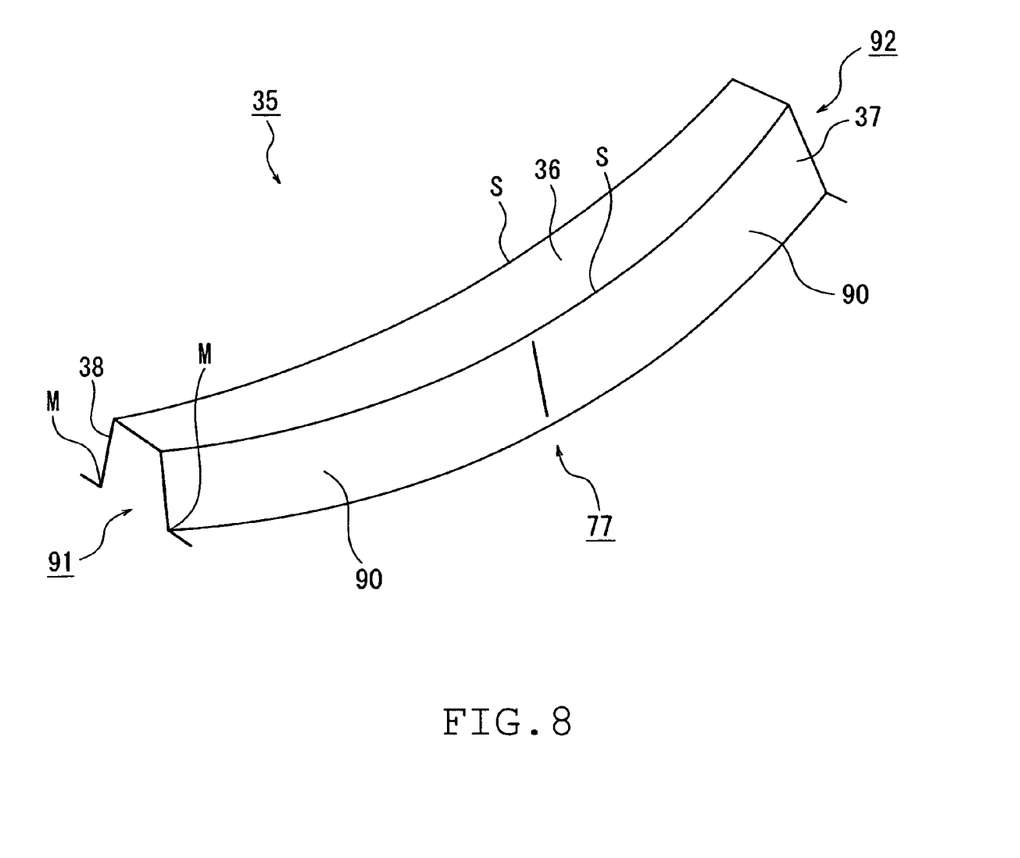
FIG. 8 is a perspective view of a tooth with a crowning formed thereon.

As shown in FIG. 8, as a result of a crowning 90 being formed, even when an assembly error occurs in the axial center and the like during assembly of the spiral bevel gear, the spiral bevel gear 30 and a partner gear can come into contact with each other in a tooth width direction center section 77 of the tooth section 35 and in a predetermined area in the tooth width direction from the tooth width direction center section 77 when the spiral bevel gear 30 and the partner gear mesh. At this time, as shown in FIG. 4, gears having a same tooth width can be paired. Alternatively, as shown in FIG. 7, gears having different tooth widths can be paired.

The crowning 90 is formed on both tooth flanks 37 and 38 of the tooth section 35 of the spiral bevel gear 30 shown in FIG. 8. The tooth section 35 on which the crowning 90 is formed is formed such that the tooth thickness is the thickest at the tooth width direction center section 77. The tooth thickness gradually decreases from the tooth width direction center section 77 towards a small diameter end section 91 and a large diameter end section 92.

A tooth crest arc section S is formed on the tooth crest of the tooth section 35. The tooth crest arc section S is formed such that the curvature radius r of the tooth crest arc section S gradually increases within a range that does not exceed the radii Ra, Rb, and Rc (see FIG. 3) of the inscribed circle inscribed within the two tooth flanks and the tooth crest on the normal plane.

A tooth root arc section M is formed at the tooth root of the tooth section 35 of the spiral bevel gear 30. The tooth root arc section M is formed such that the curvature radius r gradually increases within a range less than the curvature radius r of the tooth crest arc section S of the spiral bevel gear 30 on the normal plane T. Other configurations are similar to those described above.

According to the above-described embodiment, an example is described in which the arc sections are formed on the tooth crest and the tooth root of both tooth flanks 37 and 38 of the spiral bevel gear 30. However, this is not limited thereto. For example, a similar arc section can be formed on the spiral bevel gear 50. Alternatively, the arc section can be formed on only one tooth flank. The tooth crest arc section S can be formed on a tooth flank side that is a meshing surface of either the spiral bevel gear 30 or the spiral bevel gear 50, and the tooth root arc section can be formed on the other.

Fields in which the spiral bevel gear and the gear device of the present invention can be used are not limited. The spiral bevel gear and the gear device of the present invention can be applied to a common spiral bevel gear and a gear device using the spiral bevel gear.

What is claimed is:
1. A spiral bevel gear having a plurality of tooth sections on an outer peripheral surface of a root cone along a circumferential direction, a tooth section having a curved tooth trace and in which a shape of a tooth form on a normal plane perpendicular to the tooth trace of the tooth section becomes gradually larger as the normal plane moves from a small-diameter end section side towards a large-diameter end section side along the tooth trace, the spiral bevel gear, wherein:
the tooth section has a tooth crest arc section formed into an arc shape in a connecting section between a tooth flank on a meshing side and a tooth crest on the normal plane; and
the tooth crest arc section is formed such that a curvature radius gradually increases as the normal plane moves from the small-diameter end section side towards the large-diameter end section side within a meshing region along the tooth trace, the curvature radius gradually increasing within a range that does not exceed a radius of an inscribed circle inscribed within two tooth flanks and the tooth crest on the normal plane.

2. A spiral bevel gear having a plurality of tooth sections on an outer peripheral surface of a root cone along a circumferential direction, a tooth section having a curved tooth trace and in which a shape of a tooth form on a normal plane perpendicular to the tooth trace of the tooth section becomes gradually larger as the normal plane moves from a small-diameter end section side towards a large-diameter end section side along the tooth trace, the spiral bevel gear, wherein:

the tooth section has a tooth crest arc section formed into an arc shape in two connecting sections between two tooth flanks and a tooth crest on the normal plane; and the tooth crest arc section is formed such that a curvature radius gradually increases as the normal plane moves from the small-diameter end section side towards the large-diameter end section side within a meshing region along the tooth trace, the curvature radius gradually increasing within a range that does not exceed a radius of an inscribed circle inscribed within the two tooth flanks and the tooth crest on the normal plane.

3. The spiral bevel gear according to claim 1 or 2, wherein the curvature radius of the tooth crest arc section is equal to the radius of the inscribed circle.

4. The spiral bevel gear according to claim 1 or 2, wherein a relief is formed on both end sections in a tooth width direction of at least one tooth flank, between the two tooth flanks of the tooth section.

5. The spiral bevel gear according to claim 3, wherein a relief is formed on both end sections in a tooth width direction of at least one tooth flank, between the two tooth flanks of the tooth section.

6. A gear device includes a first spiral bevel gear and a second spiral bevel gear that meshes with the first spiral bevel gear, the first spiral bevel gear and the second spiral bevel gear having a plurality of tooth sections on an outer peripheral surface of a root cone along a circumferential direction, a tooth section having a curved tooth trace and in which a shape of a tooth form on a normal plane perpendicular to the tooth trace of the tooth section becomes gradually larger as the normal plane moves from a small-diameter end section side towards a large-diameter end section side along the tooth trace, the gear device, wherein:

the tooth section of the first spiral bevel gear has a tooth crest arc section formed into an arc shape in a connecting section between a tooth flank on a meshing side and a tooth crest on the normal plane, and the tooth crest arc section is formed such that a curvature radius gradually increases as the normal plane moves from the small-diameter end section side towards the large-diameter end section side within a meshing region along the tooth trace, the curvature radius gradually increasing within a range that does not exceed a radius of an inscribed circle inscribed within two tooth flanks and the tooth crest on the normal plane; and the tooth section of the second spiral bevel gear has a tooth root arc section formed into an arc shape in a connecting section between a tooth flank on a meshing side and a bottomland on the normal plane, and the tooth root arc section is formed such that a curvature radius gradually increases as the normal plane moves from the small-diameter end section side towards the large-diameter end section side within a meshing region along the tooth trace, the curvature radius gradually increasing within a range that is smaller than the curvature radius of the tooth crest arc section of the first spiral bevel gear on the normal plane.

7. A gear device includes a first spiral bevel gear and a second spiral bevel gear that meshes with the first spiral bevel gear, the first spiral bevel gear and the second spiral bevel gear having a plurality of tooth sections on an outer peripheral surface of a root cone along a circumferential direction, a tooth section having a curved tooth trace and in which a shape of a tooth form on a normal plane perpendicular to the tooth trace of the tooth section becomes gradually larger as the normal plane moves from a small-diameter end section side towards a large-diameter end section side along the tooth trace, the gear device, wherein:

the tooth section of the first spiral bevel gear has a tooth crest arc section formed into an arc shape in two connecting sections between two tooth flanks and a tooth crest on the normal plane, and the tooth crest arc section is formed such that a curvature radius gradually increases as the normal plane moves from the small-diameter end section side towards the large-diameter end section side within a meshing region along the tooth trace, the curvature radius gradually increasing within a range that does not exceed a radius of an inscribed circle inscribed within the two tooth flanks and the tooth crest on the normal plane; and the tooth section of the second spiral bevel gear has a tooth root arc section formed into an arc shape in two connecting section between two tooth flanks and two bottomlands on the normal plane, and the tooth root arc section is formed such that a curvature radius gradually increases as the normal plane moves from the small-diameter end section side towards the large-diameter end section side within a meshing region along the tooth trace, the curvature radius gradually increasing within a range that is smaller than the curvature radius of the tooth crest arc section of the first spiral bevel gear on the normal plane.

8. The gear device according to claim 7, wherein a tooth crest arc section similar to the two tooth crest arc sections of the tooth section of the first spiral bevel gear is formed in connecting sections between the two tooth flanks and the tooth crest of the tooth section of the second spiral bevel gear.

9. The gear device according to claim 8, wherein a tooth root arc section similar to the two tooth root arc sections of the tooth section of the second spiral bevel gear is formed in connecting sections between the two tooth flanks and the two bottomlands of the tooth section of the first spiral bevel gear.

10. The gear device according to anyone of claims 6 to 9, wherein a relief is formed on both end sections in a tooth width direction of at least one of two tooth flanks that are in contact with each other, among two tooth flanks of the tooth section of the first spiral bevel gear and two tooth flanks of the tooth section of the second spiral bevel gear.

* * * * *

UNITED STATES PATENT AND TRADEMARK OFFICE
CERTIFICATE OF CORRECTION

PATENT NO.        : 8,047,092 B2                                      Page 1 of 1
APPLICATION NO.   : 12/383410
DATED             : November 1, 2011
INVENTOR(S)       : Yasuhiro Suzuki et al.

It is certified that error appears in the above-identified patent and that said Letters Patent is hereby corrected as shown below:

Title page, Item (75) Inventors should read as follows:

Change "Yasuhiro Suzuki, Kawaguchi (JP); Issei Sato, Kawaguchi (JP)" to
--Yasuhiro Suzuki, Kawaguchi (JP); Issei Sato, Utsunomiya (JP)--.

Signed and Sealed this
Thirteenth Day of March, 2012

David J. Kappos
*Director of the United States Patent and Trademark Office*